United States Patent [19]

Schoenthal et al.

[11] Patent Number: 4,579,728

[45] Date of Patent: Apr. 1, 1986

[54] WIDE PORE ALUMINA SUPPORTS

[75] Inventors: Galeon W. Schoenthal, Houston; Lynn H. Slaugh, Cypress, both of Tex.

[73] Assignee: Shell Oil Company, Houston, Tex.

[21] Appl. No.: 726,851

[22] Filed: Apr. 24, 1985

[51] Int. Cl.$^4$ .................................................. C01F 7/02
[52] U.S. Cl. ................................... 423/626; 423/628; 423/630; 423/631
[58] Field of Search ................ 423/626, 628, 630, 631

[56] References Cited

U.S. PATENT DOCUMENTS

| | | | |
|---|---|---|---|
| 3,850,849 | 11/1974 | Kiovsky et al. | 423/626 |
| 3,853,789 | 12/1974 | Warthen et al. | 423/628 |
| 3,975,510 | 8/1976 | Leach et al. | 423/628 |
| 3,983,197 | 9/1976 | Mitschi et al. | 423/628 |
| 4,102,978 | 7/1978 | Kiovsky | 423/628 |
| 4,169,883 | 10/1979 | Murrell et al. | 423/628 |
| 4,293,448 | 10/1981 | Laurer | 423/628 |
| 4,301,033 | 11/1981 | Takumi et al. | 423/628 |
| 4,301,037 | 11/1981 | Sanchez et al. | 423/628 |

*Primary Examiner*—H. T. Carter

[57] ABSTRACT

High surface area, wide-pore-containing porous alumina are prepared by mulling together alumina hydrogel and alpha alumina monohydrate, extruding, drying and calcining at 500°–700° C.

7 Claims, No Drawings

WIDE PORE ALUMINA SUPPORTS

FIELD OF THE INVENTION

This invention relates to a process for preparing high surface area, wide-pore-containing alumina materials useful as catalyst supports in the hydrotreating area.

BACKGROUND OF THE INVENTION

In certain petrochemical reactions the use of supported catalysts having substantially all of their pores in diameters less than 50–80 Å can present many problems. Diffusional limitations can occur when reactions take place in very small pores. Many petrochemical feedstocks contain various metal impurities such as nickel, vanadium or iron which can deposit out and poison small pore sized materials. Thus, catalysts having large average pore diameters, particularly catalysts having average pore diameters above about 80 Å, have been found to have greater metals capacity than catalysts having substantially only relatively small pores. Methods for creating controlled pore sizes in aluminas are hence quite useful. Various means have been utilized in the art to prepare supports with controlled pore sizes. Carbonaceous materials have been incorporated in aluminous material which, upon burn-out, produce selected pore sizes. Another means utilized has incorporated various fine solid particles, such as recycle catalyst fines into the processing of the alumina. Detergents have been added to hydrogels, which upon extrusion resulted in wide pores.

SUMMARY OF THE INVENTION

This invention relates to a process for preparing high-surface area, wide-pore-containing alumina supports which comprises (a) mulling an alpha alumina monohydrate with water and a peptizing agent, (b) separately preparing an alumina hydrogel by precipitating an acidic aluminum salt (excepting aluminum sulfate) in aqueous solution with a basic precipitating agent, (c) mulling together the components of steps (a) and (b) wherein the ratio, basis $Al_2O_3$, of hydrogen to monohydrate ranges from about 0.1 to about 0.3, (d) extruding, drying and calcining at about 500°–700° C. the resulting product. The resulting material has a high surface area, greater than 200 $m^2/g$; a high crush strength, greater than about 9 (psi), and a substantial portion, greater than about 20%, of its pores in the range of about 100–350 Å. These materials are quite useful for preparing hydrotreating and hydrometallization catalysts. The instant invention then provides another means for tailor-making a catalyst (support) having both narrow and wide pores.

DESCRIPTION OF THE PREFERRED EMBODIMENTS

The instant invention utilizes the addition of minor amounts of alumina hydrogel to a mulled alpha-alumina monohydrate, which, upon calcining results in a high surface area alumina catalyst (support) having a significant portion of its pores in the range of 100–350 Å in addition to the pores that would have been present in the 100 Å and lower range had not the hydrogen addition been utilized.

The alpha alumina monohydrates utilized in the instant invention are readily obtainable commercially. Typical suppliers include, among others, Alcoa, Kaiser and Condea. The alpha alumina monohydrate has the beohmite or pseudobeohmite structure and is utilized in finely divided form. Coarse aggregates can be ground prior to use. The alpha alumina monohydrate is mulled with water and a pepitizing agent. The amount of water used must be sufficient to allow the alumina to be thoroughly mixed. Generally, the amount of water used will be close to that required to provide an extrudable mix, although additional water will be added with the later addition of the gel in addition to any supplemental water needed to provide an extrudable mix. A pepitizing agent is added to the material to be mulled. Such pepitizing agent is an acid, such as acetic acid or nitric acid, the former being preferred, and is added in an amount to adjust the pH of the mixture between about 3 and 6.5. The mixture is mulled for sufficient period to obtain a homogeneous mixture. Times of mulling will be dependent upon the type and efficiency of the mulling apparatus. Times ranging from about 0.1 to about 10 hours are generally suitable.

The alumina hydrogel which is to be added to the mulled alpha alumina monohydrate is prepared by precipitating an acid aluminum salt, excepting, however, aluminum sulfate, in aqueous solution with a basic precipitating medium. Suitable acidic aluminum salts include aluminum nitrate and aluminum chloride. Aluminum sulfate has been found to be not suitable, making supports with insufficiently large pores. A preferred species is aluminum nitrate. The basic precipitating salts comprise ammonium or an alkali metal carbonate or bicarbonate. The precipitation can be carried out by adding an aqueous solution of the basic precipitating salt to an aqueous solution of the acidic aluminum salt until a pH of about 6–8 is reached in the precipitating medium, or the procedure can be reversed by adding the solution of the acidic aluminum salt to the solution of the basic precipitating salt until a pH of 6–8 is obtained (referred to as "sequential precipitation"). Preferably, the precipitation is obtained by simultaneously mixing the acidic aluminum salt solution and the basic precipitation salt solution in a separate container at a pH of about 6–8 (referred to as "simultaneous precipitation"). The gel is frequently aged after precipitation, say from about 0.1-10 hrs. After precipitation, the gel is washed to remove most of the by-product salts. The gel may be partially dried, but not to the extent that the gel structure is completely destroyed.

The above-prepared hydrogel is added to the mulled alpha alumina monohydrate and the resultant material is further mulled to obtain homogeneity. Additional water may be added to provide a consistency suitable for extrusion. Small amounts of binders and lubricants may be added at this point if desired. The amount of hydrogel added to the alpha alumina monohydrate, calculated on the basis of $Al_2O_3$ present in each, will range from 1 to 50 wt %, preferably from 5 to 25 wt % total $Al_2O_3$. Mulling time will vary depending on equipment but will generally range from about 0.05 to about 5 hours.

After mulling, the mixture is extruded, dried and calcined. Drying temperatures are not critical and are typically about 50°–150° C. Drying times depend on drying temperatures and typically range from about 1-30 hours. Drying atmosphere is not critical. Frequently, drying is combined with the calcining step. Calcining is carried out at temperature ranging from up to about 500 to up to about 700° C. Calcining times are dependent on calcining temperatures and with typically range from about ½ to about 20 hours. Calcining atmosphere is not critical; although, if organic binders and/or lubricants are utilized to faciliate extrusion, calcining should be carried out in an oxidizing atmosphere. Air is a preferred calcining atmosphere.

The calcined materials are found to have surface areas (BET) greater than about 200 m$^2$/g, pore volumes (Hg intrusion @ 3000 psi) ranging from about 0.7 to about 1.0 cc/g and with at least 20% of its pore volume in pores having diameters ranging from about 100 to about 350 Å. Pore diameters are also measured by mercury intrusion. Crush strengths (measured by flat plate crush test) are greater than about 9 pounds.

The calcined alumina is most suitable for use as a catalyst in those processes catalyzed by alumina or as use as a catalyst support. It is particularly suitable as a support for preparing hydrotreating or hydrofining catalysts, for example, those utilizing Group VIIIB alone or in combination with Group VIB metals. Such catalysts can be suitably applied to hydrocarbon conversion processes such as catalytic cracking, hydrocracking, hydrotreating, reforming, isomerization, hydrogenation, dehydrogenation, oligomerization, alkylation, dealkylation, demetallization and the like.

The instant porous alumina materials when utilized to support molybdenum, vanadium and cobalt as catalytically active metals, are very suitable for demetallization reactions involving crude feedstocks. The larger pores of the instant materials are not quickly plugged up by the depositing metals, and hence provide very long life.

In a typical demetallization reaction a crude feedstock is contacted with the instant catalyst at a temperature ranging from about 350° to about 450° C. and at a pressure ranging from about 500 to 5000 psi.

The process for preparing the porous aluminum oxide materials of the instant invention will be further described below by the following illustrative embodiments which are provided for illustration and which are not to be construed as limiting the invention.

EXAMPLE 1

An alumina gel was prepared by pumping two solutions into a stirred reaction vessel containing 600 ml water at 55°. One solution was 750 g (2 mole) aluminum nitrate in 800 milliliters of water at 65° and the other solution was 2 molar ammonium carbonate at 45°. The addition time of 25 min. at a constant pH of 7 was followed by an aging step of 30 min. The precipitate was filtered and washed with a total of 14 liters of water. The filtered gel weighed 1039 g and was reduced to 516 g in an oven at 80°.

Alpha alumina monohydrate (700 grams calculated as Al$_2$O$_3$) was placed in a mulling machine. A mixture of 21 g acetic acid and 342 g of water was added over a 2 minute period. After 9 minutes of mixing another 50 ml water was added, and after 20 minutes the 516 g of alumina gel as prepared above was added. This was mixed for 10 minutes. Water was added to get loss on ignition (LOI) to 61.5% and mixing for an additional 5 minutes was carried out. The material was then extruded through a die with 1/16" holes and dried in a 120° oven overnight. The extrudate was broken into short lengths with a roller and sieved to remove fines. The material was calcined for 2 hours at 600°. Properties are shown in Table 1.

EXAMPLE 2

The above example was repeated except that the simultaneous precipitation was carried out at ambient temperature (about 20° C.) and sufficient gel was used to constitute about 20% by weight, basis Al$_2$O$_3$ of the total material. The properties of the resultant material are shown in Table 1.

EXAMPLE 3

Example was repeated except that sufficient gel was used to constitute about 7% by weight, basis Al$_2$O$_3$, of the total material. The properties of the resultant material are shown in Table 1.

EXAMPLE 4

Example 1 was repeated except that aluminum chloride was used instead of aluminium nitrate.

COMPARATIVE EXAMPLE A

In this example, only alpha aluminum monohydrate was mulled with acetic acid, extruded, dried and calcined as in Example 1. The properties are shown in Table 1.

TABLE 1

| Example | Surface Area, m$^2$/gm | Pore Vol., g/cc | Crush Strength, Pounds | Pore Size Distribution, Å |||||| 
|---|---|---|---|---|---|---|---|---|---|
| | | | | <50 | 50-70 | 70-100 | 100-150 | 150-350 | >350 |
| 1 | 261 | 0.79 | 18 | 9.3 | 23.7 | 27.8 | 25.4 | 7.7 | 6.0 |
| 2 | 295 | 0.91 | 9.1 | 15.8 | 13.7 | 14.0 | 17.0 | 27.9 | 11.6 |
| 3 | 259 | 0.86 | 21.5 | 7.7 | 25.5 | 32.9 | 12.9 | 7.1 | 13.9 |
| 4 | 217 | 0.79 | 9.7 | 2.6 | 11.9 | 26.7 | 33.4 | 15.9 | 9.4 |
| A | 314 | 0.64 | 36 | 22.6 | 49.6 | 24.1 | 0.2 | 1.3 | 2.2 |

We claim:
1. A process for preparing a high surface area, wide-pore containing, porous alumina material which comprises:
   (a) mulling an alpha alumina monohydrate with water and a peptizing agent,
   (b) separately preparing an alumina hydrogel by precipitating an aqueous solution of an acidic aluminum salt (excepting aluminum sulfate) with a basic precipitating agent,
   (c) adding the hydrogel of step (b) to the mulled alumina of step (a) wherein the ratio, basis total Al$_2$O$_3$, of hydrogel to alumina monohydrate ranges from about 1 to about 50% by weight and mulling further the mixture,
   (d) extruding the mixture of (c),
   (e) drying the extrude, and
   (f) calcining at a temperature ranging from about 500° to about 700° C.
2. The process of claim 1 wherein the basic precipitating agent is selected from the group consisting of ammonium carbonate, ammonium bicarbonate, alkali metal carbonate, alkali metal bicarbonate and mixtures thereof dissolved in water.
3. The process of claim 1 wherein the peptizing agent is acetic or nitric acid.
4. The process of claim 1 wherein the amount of hydrogel added ranges from about 5 to about 25%.

5. The process of claim 1 wherein the hydrogel is prepared by simultaneously adding the acidic aluminum salt-containing solution to the basic precipitating agent.

6. A process for preparing a porous alumina material with a surface area greater than about 200 m²g, a pore volume ranging from about 0.7 to about 1.0 cc/g, a crush strength greater than about 9 pounds and with at least 20% of its pore volume in pores having diameters ranging from about 100 Å to about 350 Å which process comprises:
- (a) mulling an alpha alumina monohydrate with water and a peptizing agent selected from acetic and/or nitric acid,
- (b) separately preparing an aluminum hydrogel by precipitating an aqueous solution of an acidic aluminum salt (excepting aluminum sulfate) with a basic precipitating agent selected from the group consisting of ammonium carbonate, ammonium bicarbonate, alkali metal carbonate, alkali metal bicarbonate and mixtures thereof dissolved in water,
- (c) adding the hydrogel of step (b) to the mulled alumina of step (a) wherein the amount of hydrogel added ($Al_2O_3$ basis) compared to the total amount of $Al_2O_3$ ranges from about 5 to about 25 percent by weight and mulling further the mixture,
- (d) extruding the mixture of (c),
- (e) drying the extrude of (d), and
- (f) calcining at a temperature ranging from about 500° to about 500° to about 700° C.

7. The process of claim 6 wherein the hydrogel is prepared by simultaneously adding the acidic aluminum salt-containing solution to the basic precipitating agent.

* * * * *